US008181123B2

(12) United States Patent
Stone-Perez et al.

(10) Patent No.: US 8,181,123 B2
(45) Date of Patent: May 15, 2012

(54) MANAGING VIRTUAL PORT ASSOCIATIONS TO USERS IN A GESTURE-BASED COMPUTING ENVIRONMENT

(75) Inventors: Kathryn Stone-Perez, Shoreline, WA (US); Jeffrey Margolis, Seattle, WA (US); Mark J. Finocchio, Redmond, WA (US); Brian E. Keane, San Jose, CA (US); Rudy Jacobus Poot, Clyde Hill, WA (US); Stephen G. Latta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 12/434,584

(22) Filed: May 1, 2009

(65) Prior Publication Data

US 2010/0281437 A1 Nov. 4, 2010

(51) Int. Cl.
*G06F 3/033* (2006.01)
(52) U.S. Cl. .......................................... 715/863; 463/39
(58) Field of Classification Search .......... 715/744–746, 715/863; 463/36–39
See application file for complete search history.

(56) References Cited

U.S. PATENT DOCUMENTS

| | | | |
|---|---|---|---|
| 6,057,909 A | 5/2000 | Yahav et al. | |
| 6,075,895 A | 6/2000 | Qiao et al. | |
| 6,100,517 A | 8/2000 | Yahav et al. | |
| 6,124,862 A | 9/2000 | Boyken et al. | |
| 6,241,612 B1 | 6/2001 | Heredia | |
| 6,256,033 B1 | 7/2001 | Nguyen | |
| 6,498,628 B2 | 12/2002 | Iwamura | |
| 6,502,515 B2 | 1/2003 | Burckhardt et al. | |
| 6,512,838 B1 | 1/2003 | Rafii et al. | |
| 6,539,931 B2 | 4/2003 | Trajkovic et al. | |
| 6,674,877 B1 | 1/2004 | Jojic et al. | |
| 6,767,287 B1 | 7/2004 | Mcquaid et al. | |
| 6,771,277 B2 | 8/2004 | Ohba | |
| 6,950,534 B2 | 9/2005 | Cohen et al. | |
| 7,006,236 B2 | 2/2006 | Tomasi et al. | |
| 7,050,177 B2 | 5/2006 | Tomasi et al. | |
| 7,151,530 B2 | 12/2006 | Roeber et al. | |
| 7,224,384 B1 | 5/2007 | Iddan et al. | |
| 7,227,526 B2 | 6/2007 | Hildreth et al. | |
| 7,293,356 B2 | 11/2007 | Sohn et al. | |
| 7,308,112 B2 | 12/2007 | Fujimura et al. | |

(Continued)

FOREIGN PATENT DOCUMENTS

WO WO 99/15863 A1 4/1999

(Continued)

OTHER PUBLICATIONS

Morris et al., Beyond Social Protocols: Multi-User Coordination Policies for Co-located Groupware, Mitsubishi Electric Research Laboratories, Jan. 2004.*

(Continued)

*Primary Examiner* — Kieu Vu
*Assistant Examiner* — James T Durkin
(74) *Attorney, Agent, or Firm* — Woodcock Washburn LLP

(57) ABSTRACT

Techniques for managing virtual ports are disclosed herein. Each such virtual port may have different associated features such as, for example, privileges, rights or options. When one or more users are in a capture scene of a gesture based system, the system may associate virtual ports with the users and maintain the virtual ports. Also provided are techniques for disassociating virtual ports with users or swapping virtual ports between two or more users.

8 Claims, 15 Drawing Sheets

U.S. PATENT DOCUMENTS

| | | | |
|---|---|---|---|
| 7,310,431 B2 | 12/2007 | Gokturk et al. | |
| 7,317,836 B2 | 1/2008 | Fujimura et al. | |
| 7,327,376 B2* | 2/2008 | Shen et al. | 345/676 |
| 7,340,077 B2 | 3/2008 | Gokturk et al. | |
| 7,367,887 B2 | 5/2008 | Watabe et al. | |
| 7,483,049 B2 | 1/2009 | Aman et al. | |
| 7,590,262 B2 | 9/2009 | Fujimura et al. | |
| 2002/0075334 A1* | 6/2002 | Yfantis | 345/863 |
| 2004/0155962 A1 | 8/2004 | Marks | |
| 2004/0207597 A1 | 10/2004 | Marks | |
| 2005/0059488 A1 | 3/2005 | Larsen et al. | |
| 2005/0183035 A1* | 8/2005 | Ringel et al. | 715/811 |
| 2005/0215319 A1 | 9/2005 | Rigopulos et al. | |
| 2006/0035710 A1 | 2/2006 | Festejo et al. | |
| 2006/0154725 A1* | 7/2006 | Glaser et al. | 463/37 |
| 2006/0188144 A1 | 8/2006 | Sasaki et al. | |
| 2006/0239558 A1 | 10/2006 | Rafii et al. | |
| 2006/0258427 A1 | 11/2006 | Rowe et al. | |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0178973 A1 | 8/2007 | Camhi | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0040692 A1 | 2/2008 | Sunday et al. | |
| 2008/0062257 A1 | 3/2008 | Corson | |
| 2008/0081701 A1 | 4/2008 | Shuster | |
| 2008/0100620 A1 | 5/2008 | Nagai et al. | |
| 2008/0113767 A1 | 5/2008 | Nguyen et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0215972 A1 | 9/2008 | Zalewski et al. | |
| 2008/0215973 A1 | 9/2008 | Zalewski et al. | |
| 2008/0261693 A1 | 10/2008 | Zalewski | |
| 2009/0005141 A1 | 1/2009 | Lehtiniemi et al. | |
| 2009/0077504 A1* | 3/2009 | Bell et al. | 715/863 |
| 2009/0085864 A1 | 4/2009 | Kutliroff et al. | |
| 2009/0138805 A1* | 5/2009 | Hildreth | 715/745 |
| 2009/0141933 A1 | 6/2009 | Wagg | |
| 2009/0167679 A1 | 7/2009 | Klier et al. | |
| 2009/0221368 A1 | 9/2009 | Yen et al. | |

FOREIGN PATENT DOCUMENTS

| | | |
|---|---|---|
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2008/049151 A1 | 5/2008 |
| WO | WO 2009/059065 A1 | 5/2009 |

OTHER PUBLICATIONS

Ahn, S.C. et al., "Large Display Interaction Using Video Avatar and Hand Gesture Recognition," 2004, 8 pages, downloaded at http://www.imrc.kist.re.kr/~kij/LNCS_2004.pdf.

Golomidov, D., "Human detection in video," Apr. 18, 2008, 13 pages, downloaded at http://seniordesign.deegrayve.net/Paper.pdf.

Karaulova, I.A. et al., "A Hierarchical Model of Dynamics for Tracking People with a Single Video Camera," 2000, 10 pages, downloaded at http://www.cs.bris.ac.uk/Events/BMVC2000/karau.pdf.

Kratz, Smith & Lee, "On hand tracking & gesture recognition; Wizards: 3D Gesture Recognition for Game Play Input," Mar. 19, 2008, 2 pages, downloaded at http://krd-haptics.blogspot.com/2008/03/wiizards-3d-gesture-recognition-for.html.

Manninen, T., "Interaction Manifestations in Multi-player Games," *Being There: Concepts, Effects and Measurement of User Presence in Synthetic Environments*, Riva, G. et al. (Eds.), 2003, 10 pages.

Morris, M.R. et al., "Cooperative Gestures: Multi-User Gestural Interactions for Co-located Groupware," *CHI 2006*, Apr. 22-28, 2006, Montreal, Quebec, Canada, 10 pages, downloaded at http://research.microsoft.com/en-us/um/people/merrie/papers/coopgest.pdf.

Perš, J. et al., "Computer Vision System for Tracking Players in Sports Games," *First International Workshop on Image and Signal Processing and Analysis*, Jun. 14-15, 2000, Pula, Croatia, 6 pages, downloaded at http://vision.fe.uni-lj.si/docs/janezp/iwispa2000-janez.pdf.

"Slots and Video Gaming", International Game Technology, (no month available) 2005, 1-86.

Feng, "What's Next for Networked Games?", NetGames 2007 Keynote Talk, Sep. 19-20, 2007, 1-74.

Gedikli et al., "An Adaptive Vision System for Tracking Soccer Players from Variable Camera Settings", Intelligent Autonomous Systems Group, The 5th International Conference on Computer Vision Systems, Bielefeld, Mar. 21-24, 2007, 10 pages.

Kane, "Postcard from Siggraph 2005: Beyond the Gamepad", www.gamasutra.com-view-feature2378-postcard_from_siggraph_2005_php, Aug. 19, 2005, 1-5.

Kless, "Larry Kless's Weblog", 2008 Year-End review: best of Klessblog, www.klessblog.blogspot.com-2008_12_01_archive.html, Dec. 31, 2008, 1-99.

PCT Application No. PCT/US2010/032975 : International Search Report and Written Opinion of the International Searching Authority, Jan. 7, 2011, 8 pages.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

* cited by examiner

MANAGING VIRTUAL PORT ASSOCIATIONS TO USERS IN A GESTURE-BASED COMPUTING ENVIRONMENT

RELATED CASES

This application is related by subject matter to U.S. patent application Ser. No. 12/434,553 entitled "Binding Users to a Gesture Based System and Providing Feedback to the Users" filed on May 1, 2009, the contents of which are hereby incorporated by reference in their entirety.

BACKGROUND

In a typical computing environment, a user has an input device such as a keyboard, a mouse, a joystick or the like, which may be connected to the computing environment by a cable, wire, wireless connection, or some other means of connection. If control of the computing environment were to be shifted from a connected controller to gesture based control, the user may no longer have a connected device to inform the computing environment of the port with which the user is associated. Further, if multiple users are in a capture area for a gesture based environment, the system must determine which user's gestures to ignore, and who to pay attention to, or who is associated with which port. Finally, if multiple users are simultaneously providing gesture based input to a computing environment, the system may need to distinguish between the multiple users and determine priority or protocol for them.

User experience in a theoretical gesture based control system may present several problems as well. For example, when a computing environment has a set input such as a controller or keyboard, a user can determine that he has a controller connected to a port, that he is pressing keys or buttons and that the system is responding. When control over the computing environment is shifted to gestures of a user, the user may require feedback that will let them know that he is being sensed, that he is bound as a controller to a system, and the like.

Accordingly, systems and methods are needed whereby a computing environment may select a principal user for a computing environment. There is also a need to have methods and systems for signing a user onto or off of a system, allowing handoff or otherwise gaining, losing or shifting control of a computing environment when the control is gesture based.

SUMMARY

Techniques for managing virtual ports are disclosed herein. Techniques for binding users to a gesture based system and providing feedback to the users are also disclosed herein.

In an embodiment, a number of states are defined that represent the user's level of interaction with virtual ports the system. These states may include, for example, an unbound/undetected state, where no user is detected in a capture area and the capture device is not bound to a user. The states may also include an unbound/detection state, where a user may be detected in an area, but the system has not yet bound to the user. The states may also include a bound/detected state, where a user is both detected by a capture device and bound to it, and it may be in this state that a user may provide gesture based commands to a gesture based system. The system may also be in a bound/undetected state, where a user who is bound moves out of the detection area of the capture device.

Feedback may be provided to the user to indicate the current state of the port and to indicate a change in state. Such feedback may, for example, take the form of a visual display, which may be a light switching on or off, changing colors or flashing. Other appropriate types of feedback, such as, for example, audio feedback, may also be employed.

Another embodiment presents systems and methods for associating users with virtual ports in a gesture based system. A first user entering into a computing session makes an entry gesture. When the gesture based system detects this entry gesture, the system may associate the first user to a primary virtual port. If a second user enters into a capture area and makes an entry gesture, the system may associate the second user with a secondary virtual port. If a third user enters into a capture area and makes an entry gesture, the system may assign the third user with a tertiary port. This pattern of assigning users to respective virtual ports may be repeated for any number of additional users. Each virtual port may have its own set of respective features including, for example, privileges, rights or options. For example, the primary port may, although need not necessarily, have additional features that are not available to the other ports.

In another embodiment, two or more users may decide to change virtual ports. For example, if there are two users, where one has the primary port and the other has the secondary port, the users may make a gesture, for example, a handshake, after which the computer will swap the virtual ports of the two users.

In another embodiment, a first user may make an exit gesture to exit gesture based control of the system. In one aspect of this embodiment, if there are other users associated with virtual ports in the computing environment, the system may re-associate the virtual ports upon exit by the first user.

In another embodiment, an application may have specific gestures which allow for user entry, exit, handoff, system pause and the like. Specific applications may also ask for volunteers for individual tasks. In such a circumstance, one or more users may make a volunteering gesture, which may cause the system to reassign virtual ports for at least the duration of the specific task.

BRIEF DESCRIPTION OF THE DRAWINGS

FIG. 8 illustrates a series of gestures that a user may make in a gesture based system, such gestures may be used to associate one or more users with virtual ports, perform handoffs, exit, pause, select, move or the like.

DETAILED DESCRIPTION OF ILLUSTRATIVE EMBODIMENTS

As will be described herein, a gesture based system may bind to individuals and associate them with virtual ports, while providing feedback of the binding states and virtual port associations. Other aspects of a computing environment may adapt to bind or inform a user, associate him with a virtual port, or maintain a consistent experience.

Figure 1A:
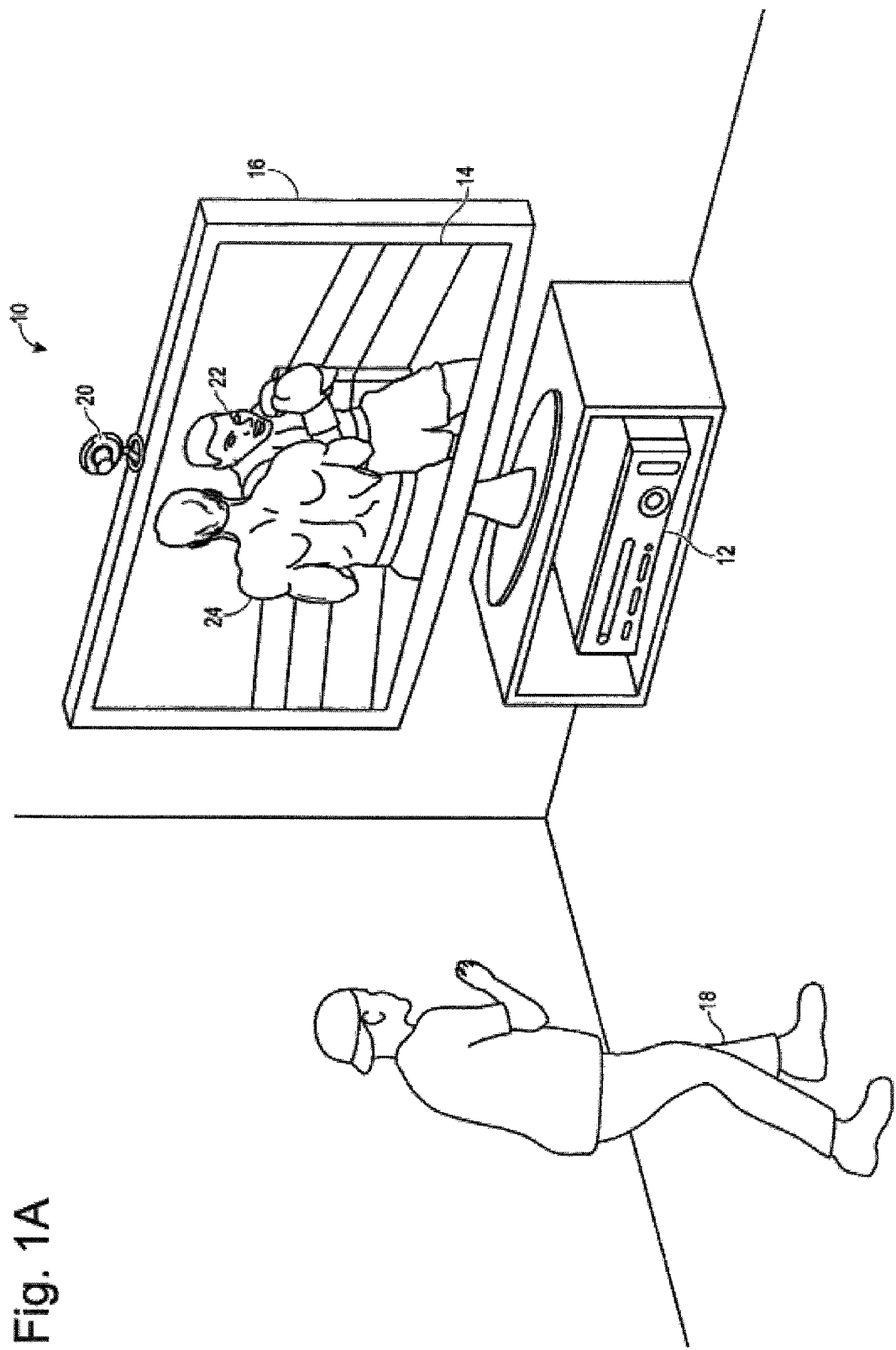
FIGS. 1A, 1B and 1C illustrate an example embodiment of a gesture based control system with a user playing a game.
Figure 1B:
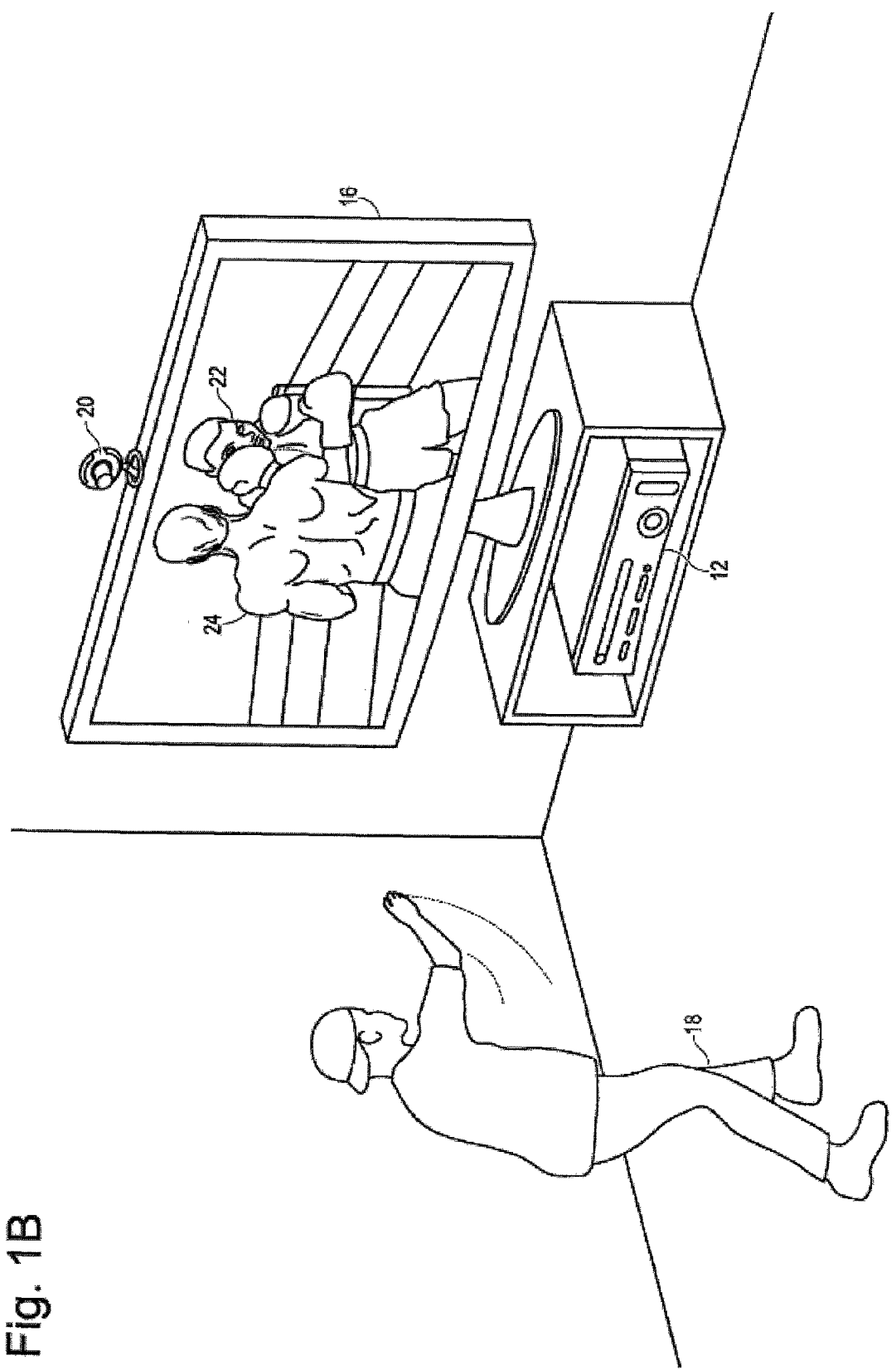

FIGS. 1A and 1B illustrate an example embodiment of a configuration of a gesture based system 10 with a user 18 playing a boxing game. In an example embodiment, the gesture based system 10 may be used to bind, recognize, analyze, track, associate to a human target, provide feedback, and/or adapt to aspects of the human target such as the user 18.

As shown in FIG. 1A, the gesture based system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the gesture based system 10 may further include a capture device 20. The capture device 20 may be, for example, a detector that may be used to monitor one or more users, such as the user 18, such that gestures performed by the one or more users may be captured, analyzed, and tracked to perform one or more controls or actions within an application, as will be described in more detail below.

According to one embodiment, the gesture based system 10 may be connected to an audiovisual device 16 such as a television, a monitor, a high-definition television (HDTV), or the like that may provide feedback about virtual ports and binding, game or application visuals and/or audio to the user 18. For example, the computing environment 12 may include a video adapter such as a graphics card and/or an audio adapter such as a sound card that may provide audiovisual signals associated with the feedback about virtual ports and binding, game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, a wireless connection or the like.

As shown in FIGS. 1A and 1B, the gesture based system 10 may be used to recognize, analyze, and/or track a human target such as the user 18. For example, the user 18 may be tracked using the capture device 20 such that the position, movements and size of user 18 may be interpreted as controls that may be used to affect the application being executed by computer environment 12. Thus, according to one embodiment, the user 18 may move his or her body to control the application.

When no user is a the capture area of the capture device 20, the gesture based system 10 may provide feedback about this unbound/non-detection state of the system 10. When the user 18 enters into the capture area of the sensing device 20, the feedback state may change from a state of unbound/non-detection to a feedback state of unbound/detecting. The system 10 may then bind to the user 18, which may change the feedback state from unbound/detecting to bound. After the user 18 is bound to a gesture based computing environment 12, he may make a gesture which will turn the rest of the system 10 on. The user 18 may also make a second gesture which will enter him into association with a virtual port. The feedback state may change such that a user 18 knows he is associated with the virtual port. The user 18 may then provide a series of gestures to control the gesture based system 10. For example, if the user 18 seeks to open one or more menus or pause one or more processes of the system 10, he may make a pause or menu gesture. After finishing with the computing session, the user may make an exit gesture, which may cause the gesture based system 10 to disassociate the user 18 with the virtual port. This may cause the feedback state to change from the state of associated with a virtual port to the state of bound/detected. The user 18 may then move out of the range of the sensors, which may cause the feedback state to change from bound/detected to non-detection. If a system 10 unbinds from the user 18, the feedback state may change to an unbound state.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a user avatar 24 that the user 18 may control with his or her movements on a screen 14. For example, as shown in FIG. 1B, the user 18 may throw a punch in physical space to cause the user avatar 24 to throw a punch in game space. Thus, according to an example embodiment, the computer environment 12 and the capture device 20 of the gesture based system 10 may be used to recognize and analyze the punch of the user 18 in physical space such that the punch may be interpreted as a game control of the user avatar 24 in game space.

The user 18 may be associated with a virtual port in computing environment 12. Feedback of the state of the virtual port may be given to the user 18 in the form of a sound or display on audiovisual device 16, a display such as an LED or light bulb, or a speaker on the computing environment 12, or any other means of providing feedback to the user. The feedback may be used to inform the user 18 when he is in a capture area of the capture device 20, if he is bound to the gesture based system 10, what virtual port he is associated with, and when he has control over an avatar such as avatar 24. Gestures by user 18 may change the state of the system 10, and thus the feedback that the user 18 receives from the system 10.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the user avatar 24. For example, the user 18 may use movements to enter, exit, turn system on or off, pause, volunteer, switch virtual ports, save a game, select a level, profile or menu, view high scores, communicate with a friend, etc. Additionally, a full range of motion of the user 18 may be available, used, and analyzed in any suitable manner to interact with an application.

Figure 1C:
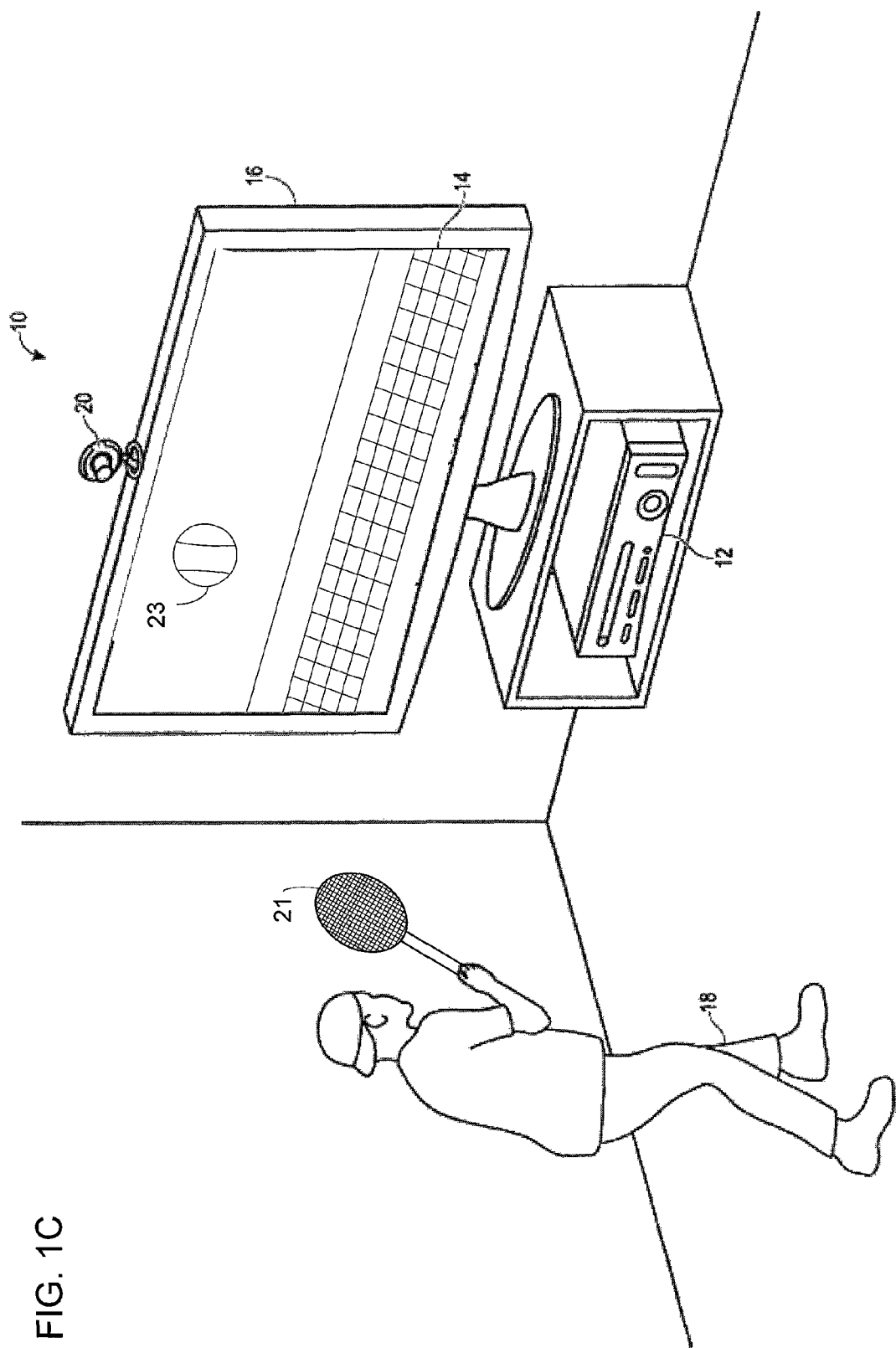

In FIG. 1C, the human target such as the user 18 may have an object such as racket 21. In such embodiments, the user of an electronic game may be holding the object such that the motions of the user and the object may be used to adjust and/or control parameters of the game, such as, for example, hitting an onscreen ball 23. The motion of a user holding a racket 21 may be tracked and utilized for controlling an on-screen racket in an electronic sports game. In another example embodiment, the motion of a user holding an object may be tracked and utilized for controlling an on-screen weapon in an electronic combat game. Any other object may also be included, such as one or more gloves, balls, bats, clubs, guitars, microphones, sticks, pets, animals, drums and the like.

According to other example embodiments, the gesture based system 10 may further be used to interpret target movements as operating system and/or application controls that are outside the realm of games. For example, virtually any controllable aspect of an operating system and/or application may be controlled by movements of the target such as the user 18.

Figure 2:
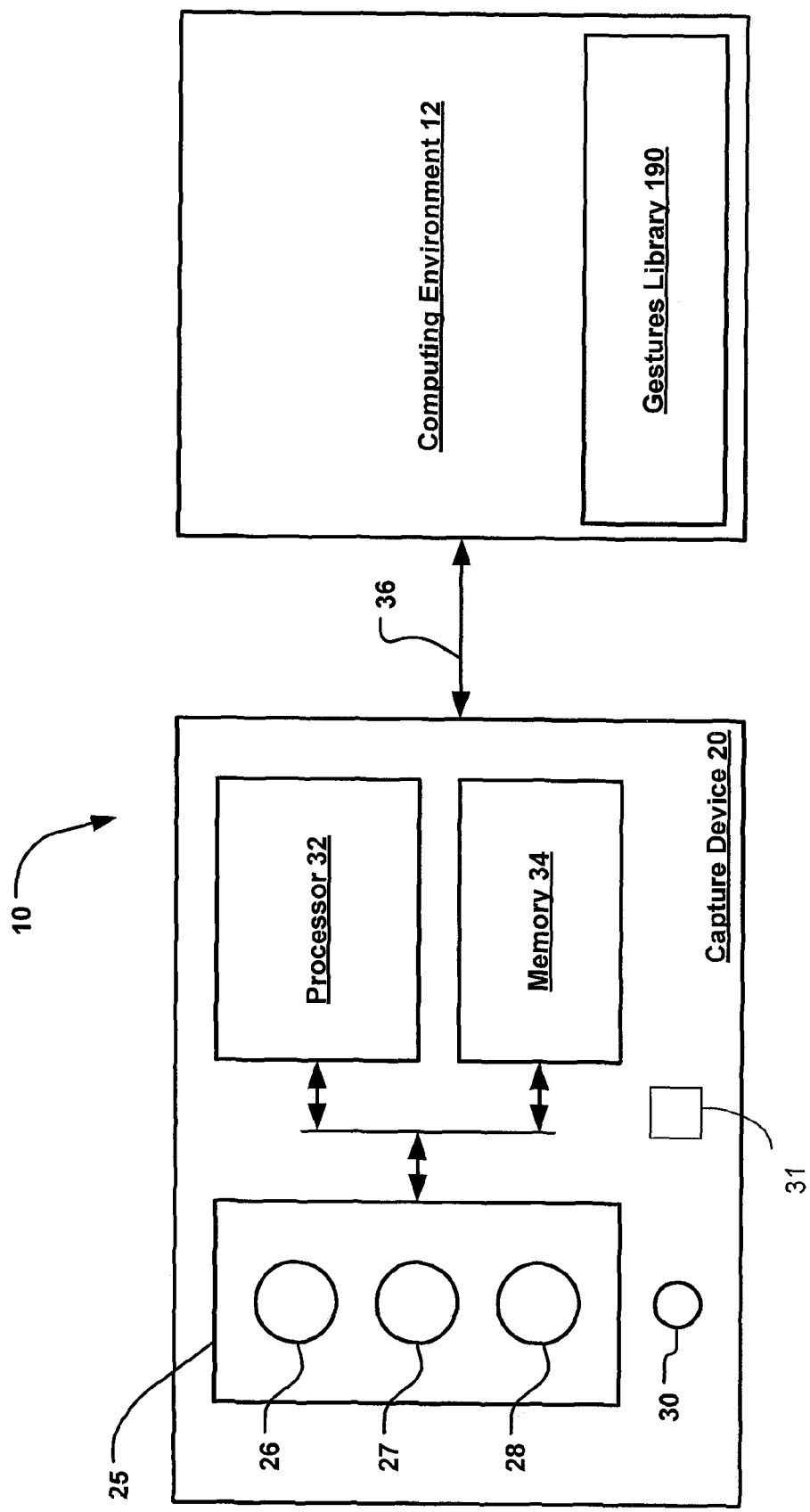
FIG. 2 illustrates an example embodiment of a capture device that may be used in a gesture based system.

As shown in FIG. 2, according to an example embodiment, the image camera component 25 may include an IR light component 26, a three-dimensional (3-D) camera 27, and an RGB camera 28 that may be used to capture the depth image of a scene. For example, in time-of-flight analysis, the IR light component 26 of the capture device 20 may emit an infrared light onto the scene and may then use sensors (not shown) to detect the backscattered light from the surface of one or more targets and objects in the scene using, for example, the 3-D camera 27 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 26. Upon striking the surface of one or more targets or objects in the scene, the pattern may become deformed in response. Such a deformation of the pattern may be captured by, for example, the 3-D camera 27 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the gesture based system 10. Additionally, the microphone 30 may be used to receive audio signals that may also be provided by the user to control applications such as game applications, non-game applications, or the like that may be executed by the computing environment 12.

The capture device 20 may further include a feedback component 31. The feedback component 31 may comprise a light such as an LED or a light bulb, a speaker or the like. The feedback device may perform at least one of changing colors, turning on or off, increasing or decreasing in brightness, and flashing at varying speeds. The feedback component 31 may also comprise a speaker which may provide one or more sounds or noises as a feedback of one or more states. The feedback component may also work in combination with computing environment 12 or processor 32 to provide one or more forms of feedback to a user by means of any other element of the capture device, the gesture based system or the like.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, user profiles or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 27 and/or the RGB camera 28, and a skeletal model that may be generated by the capture device 20 to the computing environment 12 via the communication link 36. The computing environment 12 may then use the skeletal model, depth information, and captured images to, for example, create a virtual screen, adapt the user interface and control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 27 and device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
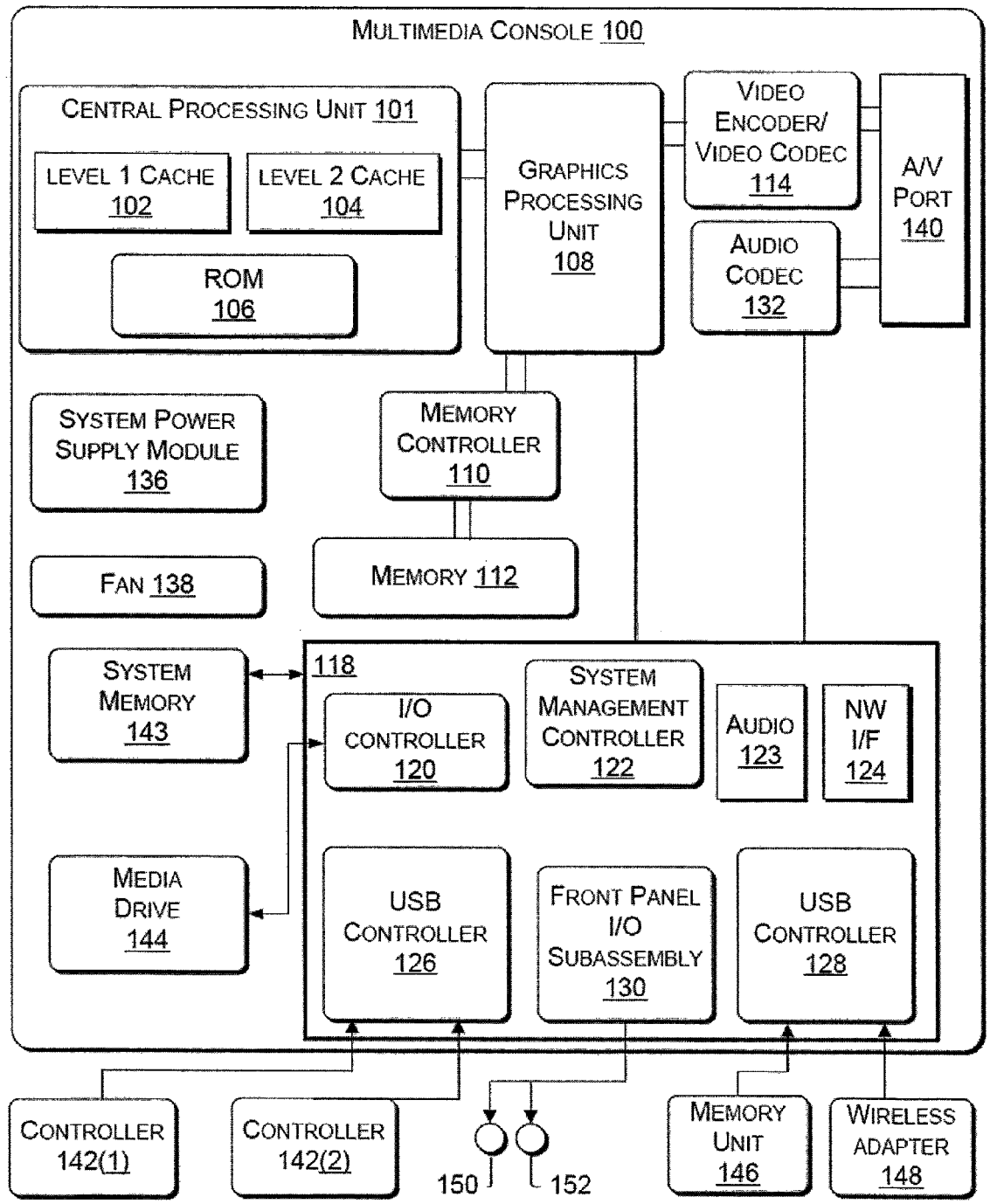
FIG. 3 illustrates an example embodiment of a computing environment that may be used to interpret one or more gestures of a user bound to the gesture based system and associated with the virtual port.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The front panel I/O subassembly 130 may include LEDs, a visual display screen, light bulbs, a speaker or any other means that may provide audio or visual feedback of the state of control of the multimedia control 100 to a user 18. For example, if the system is in a state where no users are detected by capture device 20, such a state may be reflected on front panel I/O subassembly 130. If the state of the system changes, for example, a user becomes bound to the system, the feedback state may be updated on the front panel I/O subassembly to reflect the change in states.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 4:
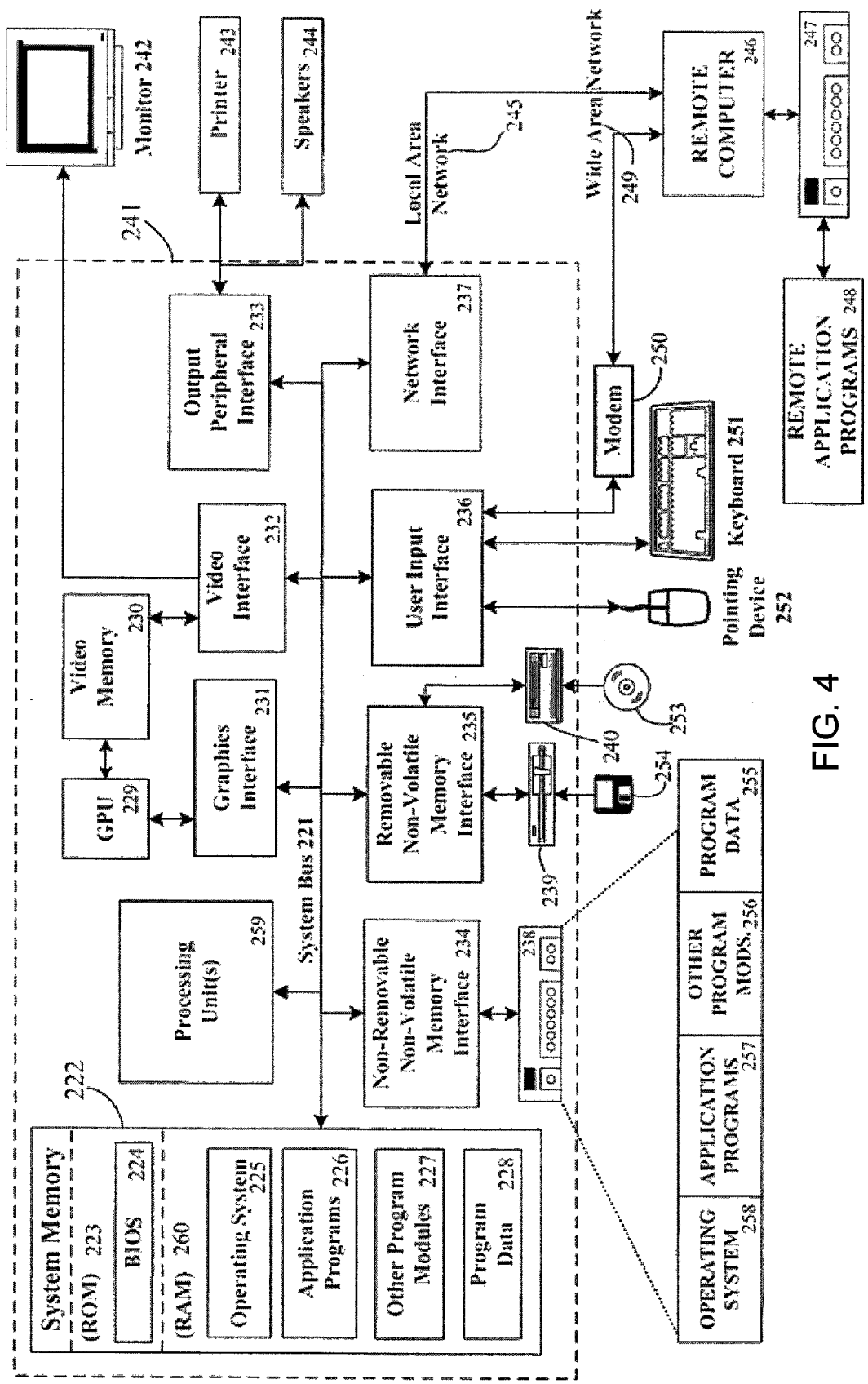
FIG. 4 illustrates another example embodiment of a computing environment that may be used to interpret one or more gestures of a user bound to the gesture based system and associated with the virtual port.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
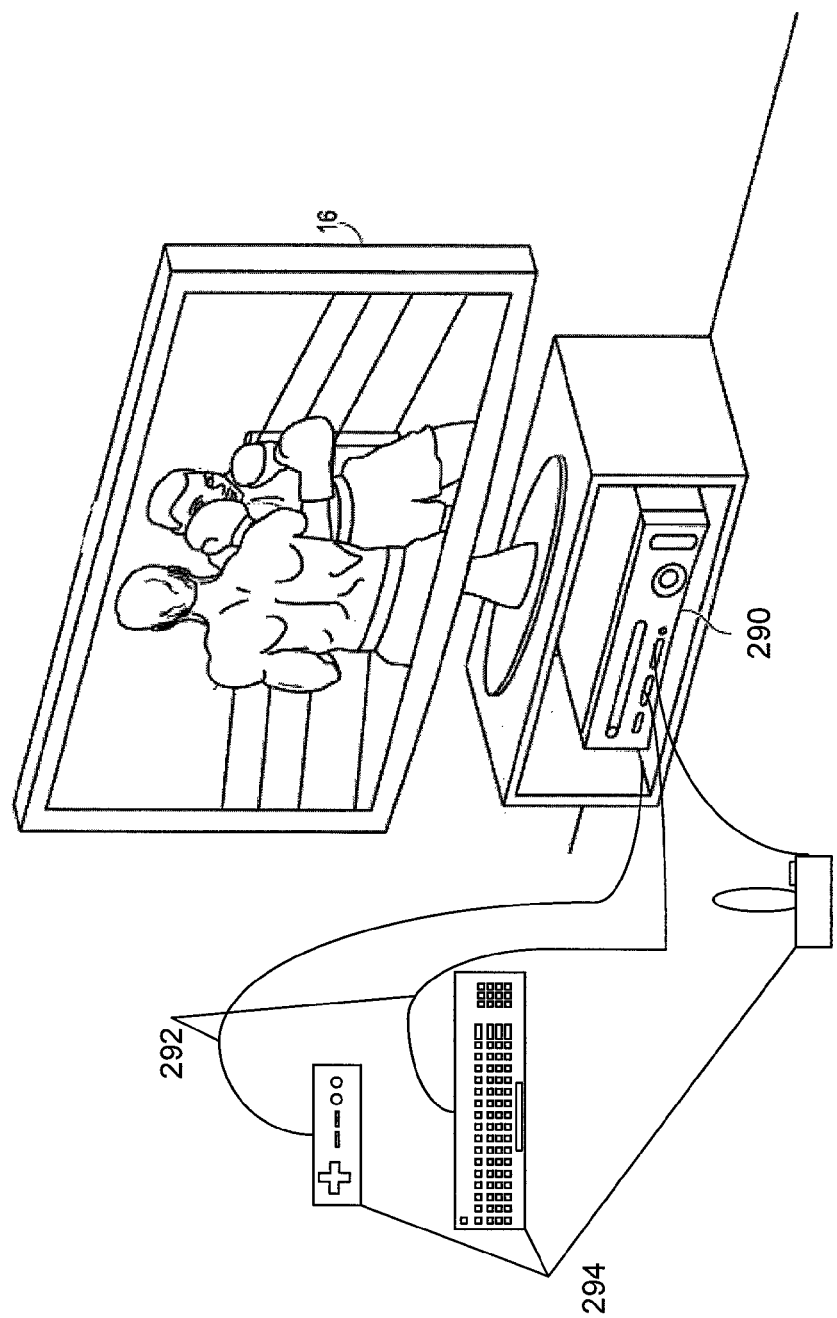
FIG. 5 illustrates an example of a previous control environment for a gaming system where controllers, connected with a cable or wirelessly may be used to control a computing environment.

FIG. 5 illustrates an example embodiment of a prior art system using only connected controls. In such an embodiment, controllers 294, such as a gaming controller, a joystick, a mouse, a keyboard or the like are connected to a computing environment 12 either with a cable 292 or wirelessly. Pressing particular buttons or keys may cause set signals to be sent to the computing environment. Further, these controllers are typically associated with specific physical ports 290. In an example of a gaming environment, controller 1 may be plugged into a first physical port, controller 2 may be plugged into a second physical port etc. The controller 1 may have associated therewith primacy of control, or control of certain aspects of the gaming environment that are not available to the other controllers. For example, when selecting a specific level or board in a fighting game, only the first controller may be able to choose.

The gesture based system such as gesture based system 10 may need to associate virtual ports with one or more users, and to associate a first controller with a user without using the physical cables and ports of the prior art. If there are multiple users, each associated with a virtual port, the users may need feedback to determine with which ports they are associated. If, after initial association of a user to a virtual port, the port needs to be re-associated with a second user, both users may need some feedback to indicate that the virtual port has re-associated. When the virtual ports re-associate with different users, additional audio or visual feedback (in addition to the standard feedback that may be displayed continually) may be provided at or near the time of the re-association to further alert the users that the re-association has occurred. Other aspects of each users gaming environment, such as their characters on the screen, the side of the screen they may be on in a split-screen game, and other aspects may not change with the re-association of the virtual port.

Figure 6:
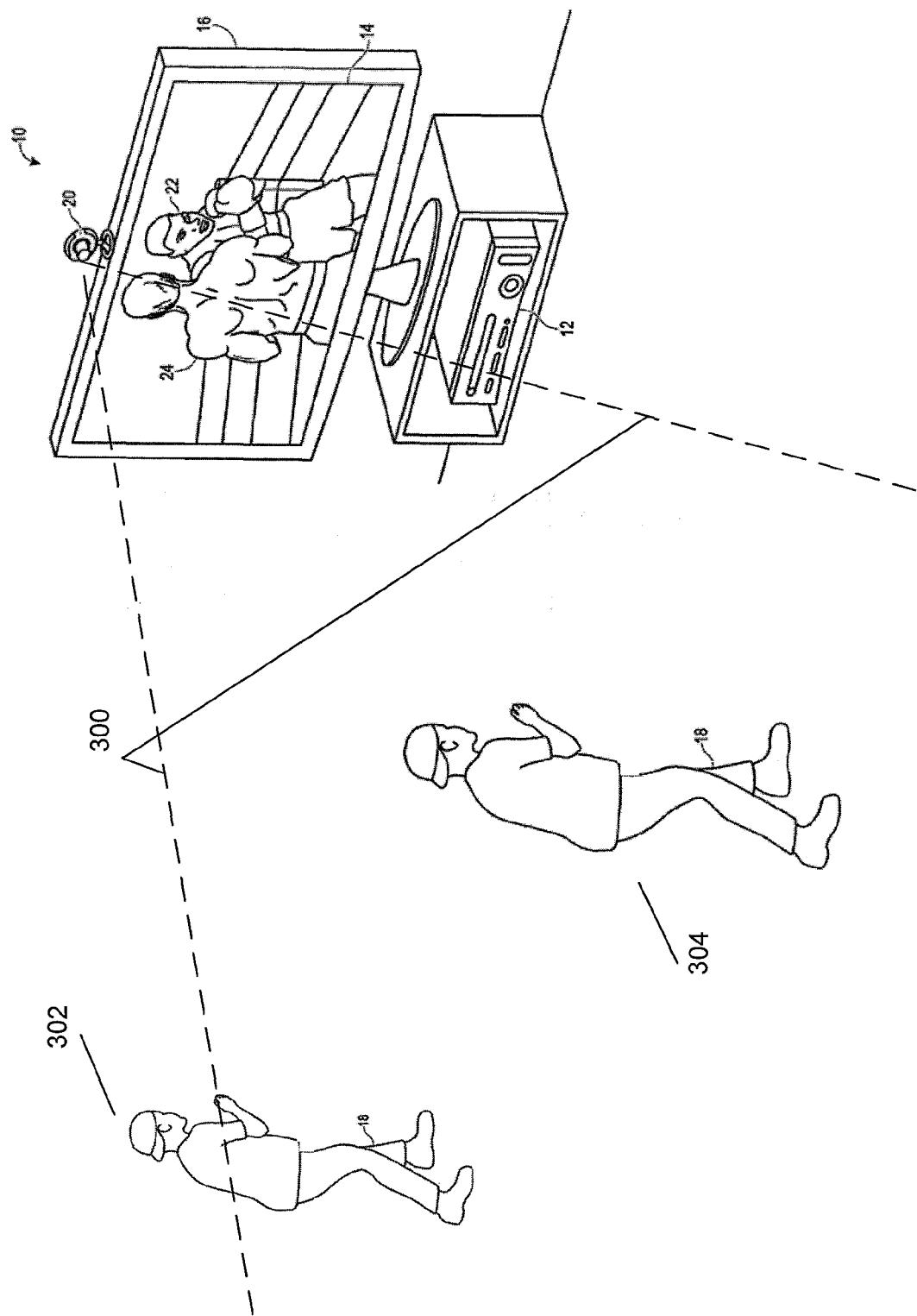
FIG. 6 illustrates multiple users in a capture area of a gesture based system that may be bound the users, provide feedback to them and associate them with a virtual port.

FIG. 6 illustrates a capture area 300 as may be captured by capture device 20 as described above with regard to FIG. 2. In an embodiment, if there are no users in a capture area, such as capture area 300, the front panel of the computing environment 12, the capture device 20 or audiovisual display 16 may provide feedback of that first state. Such a first state may be considered an unbound/no-detection state.

In a second embodiment of FIG. 6, a first user 302 may have stepped partially into a capture area 300. In FIG. 6, the first user 302, is not fully within the capture area 300 of capture device 20, which may mean that the gesture based system 10 may not be able to bind to the first user 302. In such an event, feedback provided to the first user 302 by computing environment 12, or capture device 20 or by audiovisual display 16 may depict an unbound/detected state. The gesture based control system 10 may be in the unbound/detected state anytime a user steps into a capture area, or when a user is only partially in the capture area as is user 302.

In another embodiment, a second user 304 may be in the capture area 300. In such an event, the gesture based control system 10 may have bound the second user 304 as a controller of the gesture based control system 10. Feedback may be provided to user 304 in the form of a bound state of feedback by at least one of the capture device 20, audiovisual display 16 or computing environment 12.

In another aspect, if a second user such as 304 is bound to the gesture based control system and steps out of the capture area 300, the system may enter a state where the second user 304 is still bound to the system 10 but is not currently detected. Such a state may be a bound/undetected state. Feedback may be provided by at least one of capture device 20, computing environment 12 or audiovisual device 16 when the second user 304 returns to the capture area 300 during the time period when he is still bound to the gesture based control system. The association of the user with virtual ports and the like will be maintained while the user has exited the capture area 300.

If multiple users are in a capture area 300, the gesture based control system 10 may provide feedback about the state of each user in the capture area. For example, all users may be bound to the gesture based system 10 and associated with virtual ports and be provided a state of bound/associated feedback specific to each user. The feedback provided may also include feedback to the first user 302 and the second user 304 about which virtual port they may be associated. For example, the first user 302 may be associated with the primary virtual port, and feedback may be provided to indicate to the first user 302 that he is associated with the primary virtual port.

In another aspect of a gesture based control system 10 with a capture area 300, a user may step too far, too close, or too much to either the left or the right of the capture device 20. In such a circumstance, the gesture based control system 10 may provide feedback in the form of either an 'out of range' signal, or specific feedback informing a user that he may need to move in a particular direction in order for the capture device 20 to properly capture his image. For example, if a second user 304 moves too far to the left, then an arrow may pop up on the screen directing him back to the right. Such directions provided to the user may also be provided by the capture device 20, or the computing environment 12. An audio signal may accompany such visual feedback as described above.

In one embodiment, the different feedback states take the form of different color light emitters. For example, feedback for an 'unbound/undetected' state may be black or powered down, feedback for an 'unbound/detected' state may be yellow, feedback for a 'bound/detected' state may be green, and feedback for a 'bound/undetected' or 'out of range' state may be blue. This color scheme is merely provided as an example, and any other color scheme may be used. In another embodiment, the feedback states may involve flashing vs. constantly emitting lights. For example, the feedback for an 'unbound/undetected' state may be powered off, feedback for an 'unbound/detected' state may be flashing, and feedback for a bound state may be constantly emitting. In another embodiment, there may be audio feedback for shifts between states, or during a particular state. The feedback provided to a user about his state as a controller of computing environment 12 may include any combination of the above examples and any other appropriate feedback.

The feedback to each user may be associated with an avatar or particular light or display on the capture device 20, the computing environment 12 or the audiovisual display 16. There may be changes in which virtual port a user is associated with during one or more computing sessions. Certain embodiments may provide feedback to users that they have switched from one virtual port to another, however, certain aspects of the computing environment and the feedback to the users may remain the same. For example, if a user has a particular light or LED associated with his session, the light or LED may still represent him even if he switches virtual ports. In another example, the avatar associated with a user may remain the same even if the user switches virtual ports. As a further example, an avatar of a user may be highlighted or otherwise show some shift in appearance if the user switches virtual ports. In another embodiment, if there is a split screen game or side of a screen that a user starts a session on, then these elements may not change if there is a re-association of virtual ports.

Figure 7:
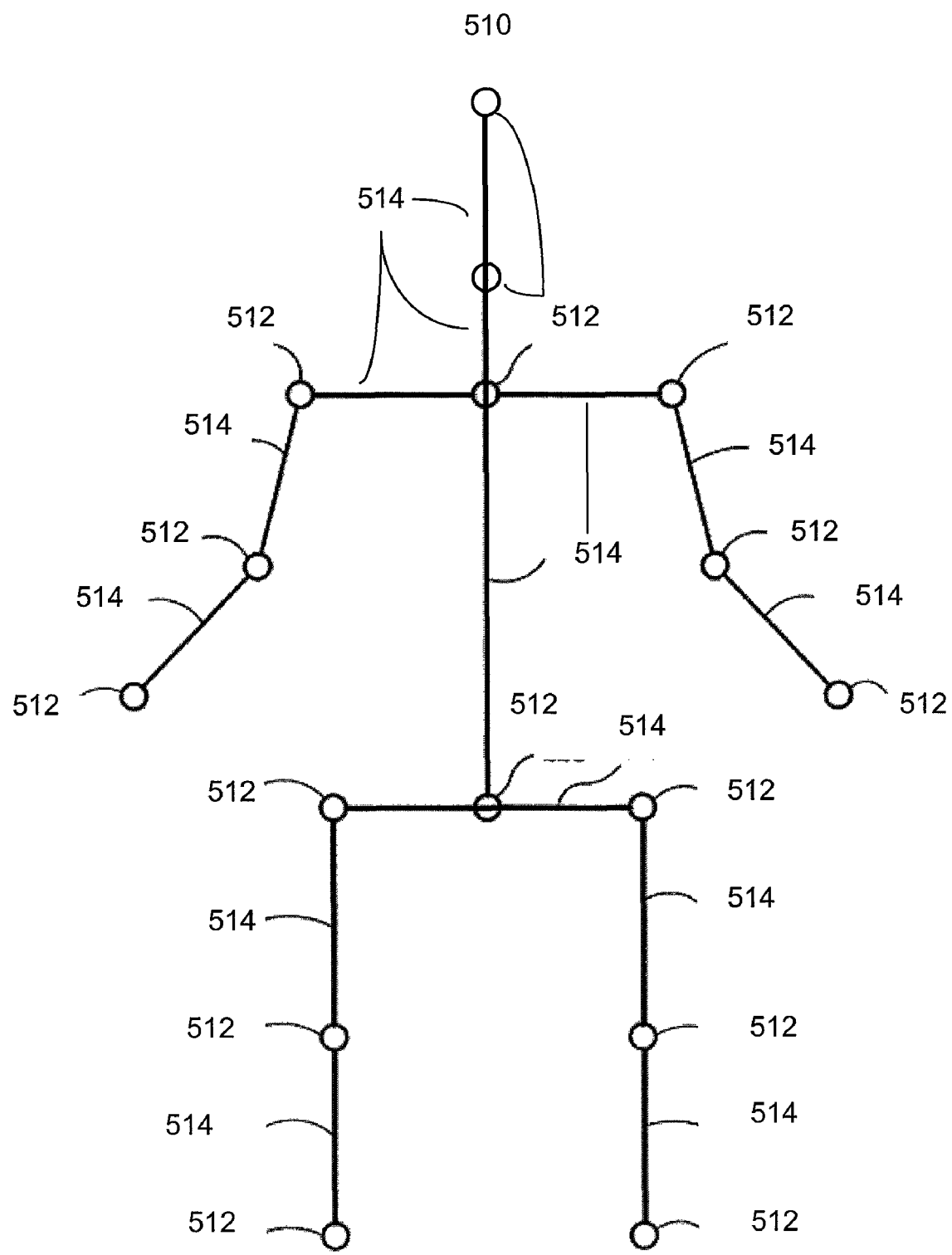
FIG. 7 illustrates one example of a user as he may be modeled by a gesture based system, where the user is modeled as joints and limbs, and the motion of these joints and limbs may be used to interpret gestures for a gesture based computing environment.

FIG. 7 depicts a model of a human user 510 that may be created using the capture device 20 and the computing environment 12. This model may be used by one or more aspects of the gesture based system 10 to determine gestures and the like. The model may be comprised of joints 512 and bones 514. Tracking these joints and bones may allow the gesture based system to determine what gestures a user is making. These gestures may be used to control the gesture based system.

Figure 8:
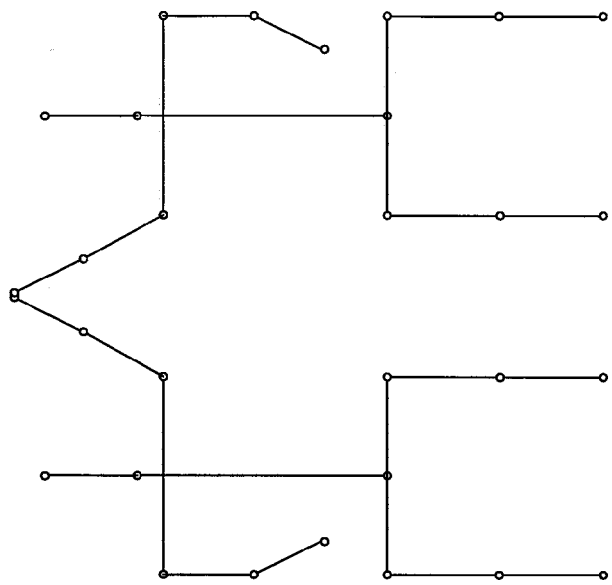
Figure 8:
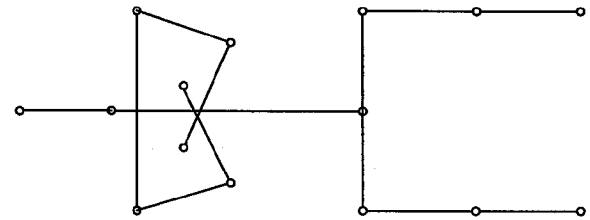
Figure 8:
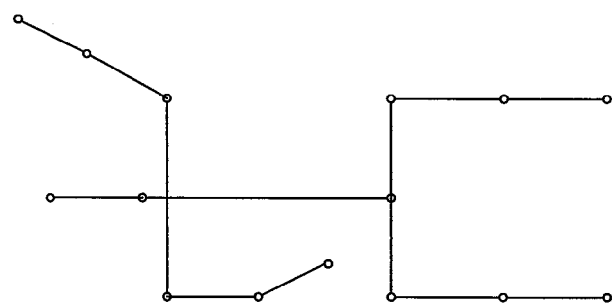

FIG. 8 depicts a series of gestures such as a wave or raised hand 520, making an X with arms 522, or a high five 524. Although not limited in any way by the few gestures that have been depicted, these gestures, along with any others may be commands for the gesture based system 10. In one embodiment, gestures may be universal, meaning that they would not be limited to particular software or hardware applications. In another embodiment games or other programs operated on computing environment 12 may have program specific gestures. For example, a universal gesture to handoff a virtual port may be a handshake; however, a game such as a wrestling game may have a program specific gesture which performs a handoff of control if the users perform a high-five 524.

Universal gestures for binding and associating users to virtual ports may include a gesture for associating the user making the gesture with a virtual port, a gesture to disassociate with a virtual port, a pause gesture, a menu gesture, a volunteer gesture, a system power on gesture, a system power off gesture, a select gesture, an exit gesture, a handoff gesture and the like.

Figure 9:
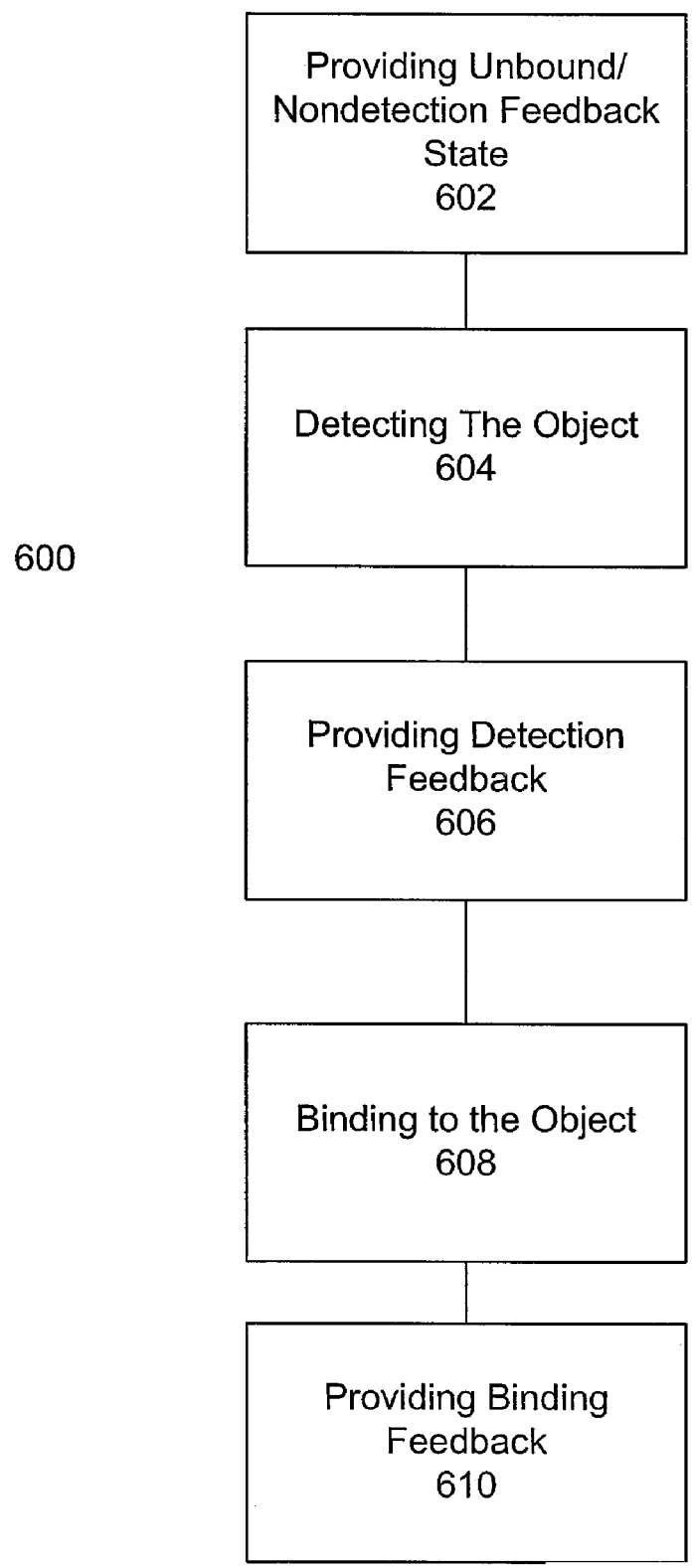
FIG. 9 depicts a flow diagram for changing a gesture based system from an unbound to a bound state and providing a user feedback of his state.

FIG. 9 depicts a block diagram 600 for binding a user to the gesture based system and providing feedback to him regarding his state. In one embodiment, the process for entering a user as a controller involves the steps of detecting the user, then binding to them and then detecting a specific command which associates the user with a virtual port. Without some sort of feedback from the system, a user may be unaware of his status in the gesture based system. For example, a user in an 'unbound/detected' state may be frantically making a gesture to, for example, turn the system on. The system may be incapable of performing this function until a user is in a bound state, which may lead to frustration for the user if he is unaware of his state in the gesture based system. As another example, if a user who is bound to the gesture based system and associated with a virtual port moves out of the range of detection by the capture device, the system may lose the ability to receive commands. In such a circumstance, it may be important to provide feedback to the user informing him that he may need to move in order to return to the capture area and input gesture based commands to the gesture based system.

At 602, when no user is detected in the capture area, the gesture based system may be in an unbound/non-detection state and may be providing feedback representing this state. This feedback may be, for example, an off state of a light emitter, or a silent state from a speaker, or it may be a light emitter of a certain color or shape or periodicity.

At 604, one or more of the sensors on capture device 20 described above with respect to FIGS. 1A-1B may detect a user. In one embodiment, the user enters into the capture area of one or more of the cameras of the capture device. In another embodiment, a microphone or the like detects noise from a user.

At 606, when a user is detected, the feedback state of the gesture system may switch from a feedback state of 'unbound/non-detection' to a state of 'unbound/detection'. This feedback state may be a light emission of a particular color, a noise, or a flashing light emitter. In one embodiment, this state is skipped completely, and the only feedback states are bound and unbound.

At 608, the gesture based system may bind to the user. Binding may occur when the system builds a model such as model 510 described with respect to FIG. 7. In another embodiment, binding may involve looking up one or more user profiles and comparing the model of the user with the user profiles. After binding at 608, the system is in a state such that it may receive and interpret gestures as commands from a user.

At 610, the system may provide feedback to a user informing him that he is in the bound state. As above, this feedback may take the form of any noise or light emission on any screen, surface or projection from the gesture based system.

Figure 10:
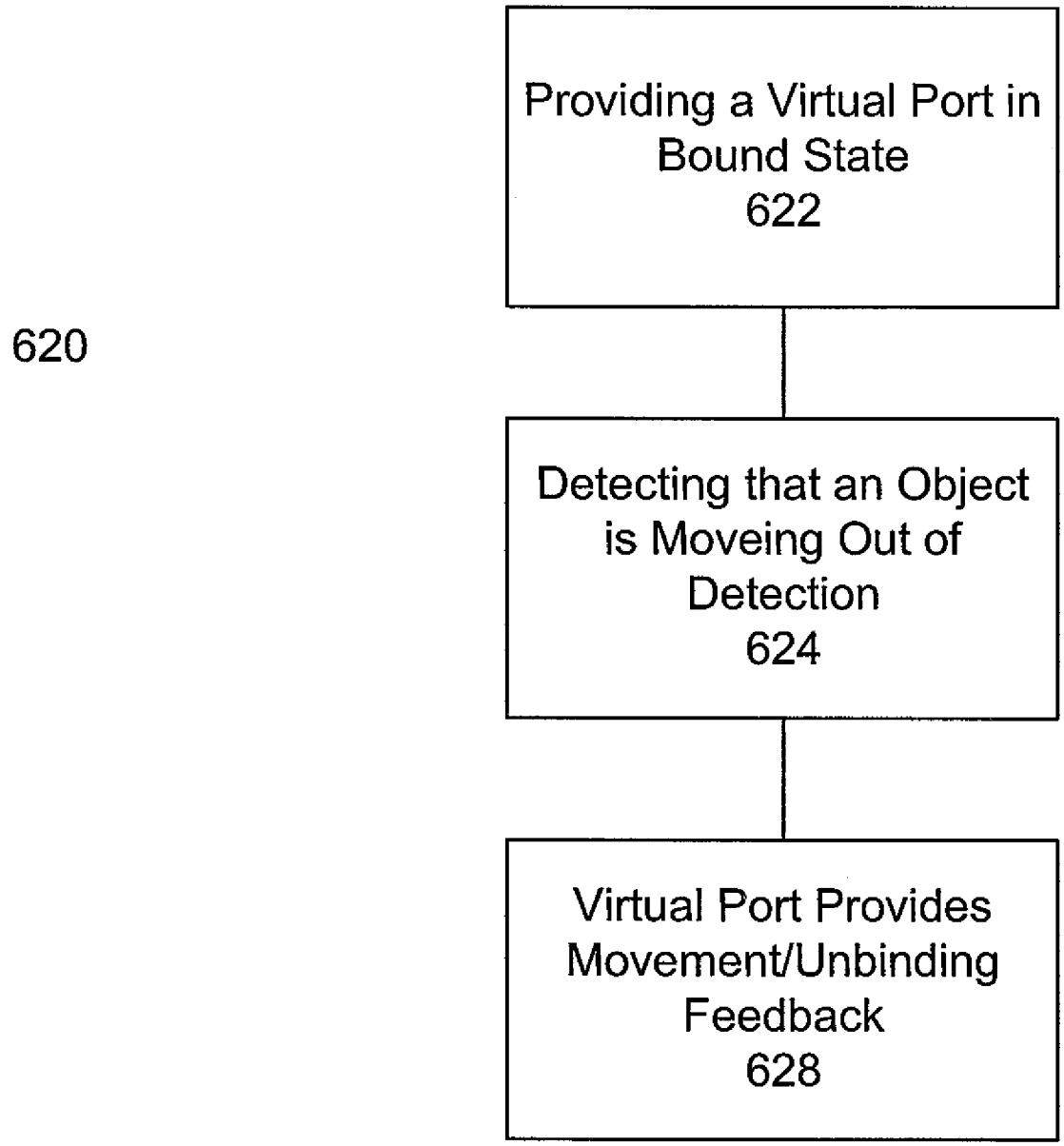
FIG. 10 depicts a flow diagram for providing a user feedback to a user about his state when he is moving out of a capture area.

FIG. 10 depicts a block diagram 620 for unbinding a user from a gesture based system. In one embodiment, at 622 a port and user are in a bound state. The user may merely walk out of a capture area, such as capture area 300, which is detected at 624. If a user does not return, the feedback state switches from a state of bound to a state of unbound/undetected at 628. In one embodiment, there may be a delay between the time that a user such as user 18 exits a capture area and when the system becomes unbound and provides unbound feedback to the user. Such a delay may allow a user to exit a capture area during a session, or for a short period of time and to return to the capture area having maintained his virtual port and other elements of his computing session.

Figure 11:
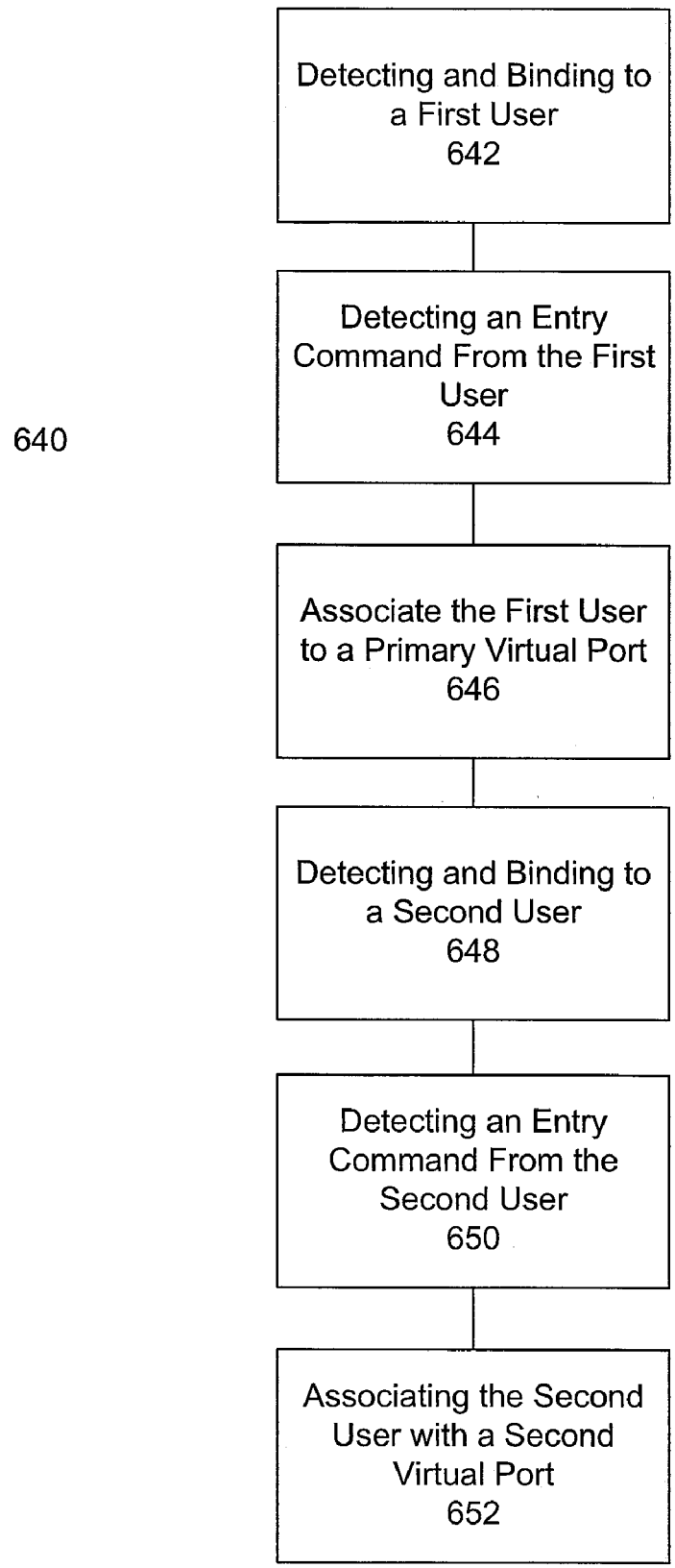
FIG. 11 depicts a flow diagram for associating virtual ports with users.

FIG. 11 depicts a block diagram 640 for an example embodiment to associate one or more people to virtual ports of a gesture based system. In a gesture based system, a user typically does not have a controller with an established physical port. Instead, the system must assign virtual ports to one or more users. Further, these virtual ports may need to be assigned as either primary or secondary or tertiary or the like and may have associated with them different features, such as, for example, privileges, rights or options. These features may change during the course of one or more computing sessions.

At 642 a user may be bound to the system as described above. Once a user is bound to a gesture based system, he may be able to provide commands to the system by making one or more gestures. One such gesture may be an entry gesture. The gesture based system may detect an entry command from the first user at 644. The entry command is an optional feature, and the user need not necessarily provide an entry command in order to be associated with a port. In some cases, simply entering or being detected in a capture area may be sufficient to be associated with a port.

At 646, the gesture based system may associate the user to the primary virtual port. The primary virtual port may have additional controls over the gesture based system that other ports associated with a gesture based system may not have. For example, the user associated with the primary port may be allowed to make initial selections on menu or title pages. The user associated with the primary port may also be the first to make selections for avatars or other elements such as boards or the like in a gaming environment.

At 648, a second user may enter may be detected in a capture area and bound to a gesture based system. Once the second user is bound to a gesture based system, he may be able to provide commands to the system by making one or more gestures. One such gesture may be an entry gesture. The entry gesture provided by the second user may be the same as of different from the entry gesture provided by the first user. There may be one or more entry gestures, any one of which a user may provide to a gesture based system in order to associate with a virtual port. The entry command is an optional feature, and the user need not necessarily provide an entry command in order to be associated with a port. In some cases, simply entering or being detected in a capture area may be sufficient to be associated with a port.

At 652, the second user may be associated with a secondary virtual port. The secondary virtual port may have features that are different than those associated with the primary virtual port. In one example, the secondary virtual port may have associated therewith a cursor; however, the cursor may not be used for making selections on certain menu screens or selection screens or the like. In another example, the secondary virtual port may be used for selecting one or more options on certain screens when the primary virtual port may not have rights to make selections. For example, the second user may be able to select an avatar or the like when the first user may not have any control over the screen or a portion of the screen.

Figure 12:
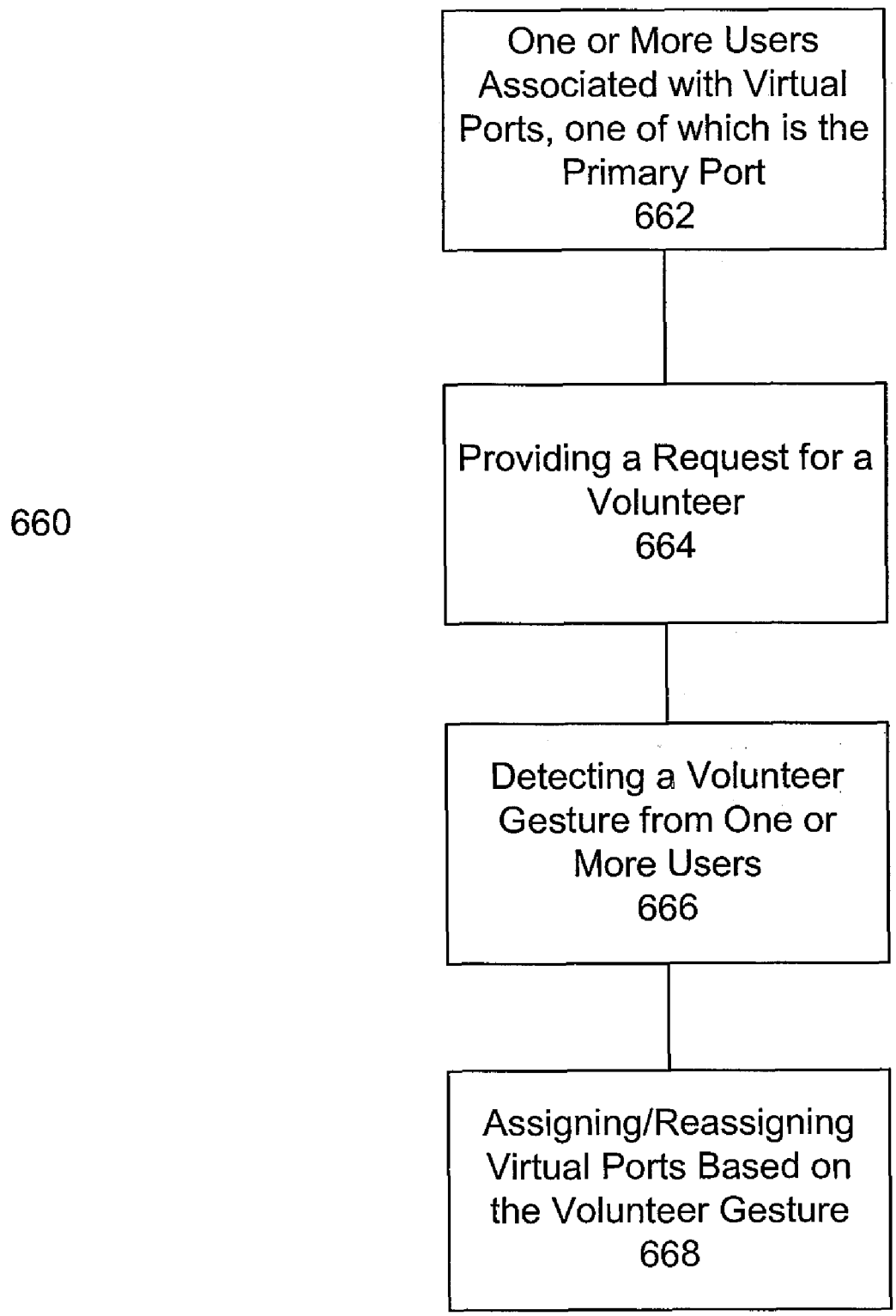
FIG. 12 depicts a flow diagram for associating virtual ports with two or more users based on a volunteer request from a gesture based system.

FIG. 12 depicts a block diagram 660 for a gesture based system requesting a volunteer and assigning virtual ports based on the volunteering. At 662, two or more users may be bound to a gesture based environment and may be associated with two or more ports, one of which is the primary port.

At 664, the gesture based environment may provide the users with a request for one or more volunteers. In one embodiment, this process may be used to reassign one or more virtual ports to one or more users. In another embodiment, the volunteering may be used in a software or hardware application such as a gaming application where one or more users may be assigned specific tasks. The gesture based system may request that a user make a volunteer gesture, move to a specific point in the capture area, or there may be a universal gesture that a user may make to act as a volunteer. In another embodiment, the gesture based environment may project a virtual spotlight into the room, and a volunteer may step into this virtual spotlight, which may have an on screen representation, in order to volunteer.

At 666, the system may detect on or more volunteer gestures from one or more users. The gesture based system may re-associate the virtual ports at 668 based on the volunteering gestures. In one embodiment, when a user volunteers, the primary port may be associated with them for the duration of the volunteering task. In another embodiment, the primary port may be associated with a user who volunteers until the session ends or another event that creates a re-association of virtual ports happens. While the virtual ports may be re-associated, other aspects of the system may remain the same. For example, avatars, positions, feedback and the like may not change with the re-association of a virtual port. In another embodiment, at least one of avatars, positions feedback or the like changes when the virtual ports change associations between users.

Figure 13:
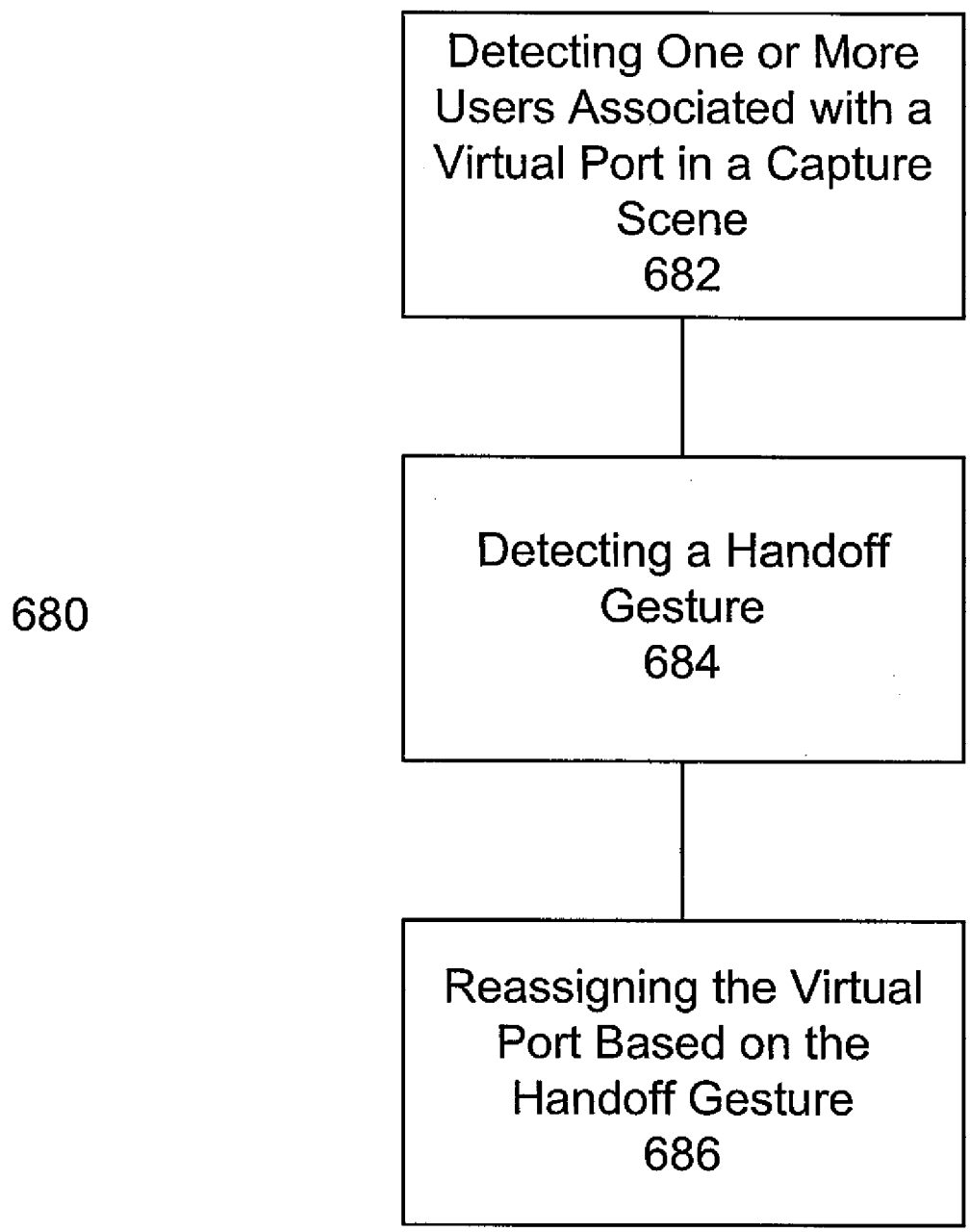
FIG. 13 depicts a flow diagram for creating a handoff of virtual ports between two or more users.

FIG. 13 depicts a block diagram 680 of an exemplary method for handing off or switching virtual ports between two or more users. At 682, one or more users may be associated with one or more virtual ports in a computing environment. One of the users may make a handoff gesture which is detected by the gesture based system at 684. The gesture based system may re-associate one or more virtual ports based on the handoff gesture at 686.

As an example, a first user associated with a first virtual port may make a handoff gesture to a second user that is not currently associated with any virtual port. This may cause the first virtual port to be switched from the first user to the second user. This may also cause the first user to be reassigned to another available virtual port.

As another example, a first user associated with a first virtual port may make a handoff gesture to a second user that is currently associated with a second virtual port. This may cause the first virtual port to be switched from the first user to the second user. This may also cause the second virtual port to be switched from the second user to the first user.

As another example, such as a tag team wrestling game, two or more users may high five in order to hand off a virtual port or control of the game. In the tag team wrestling example, it may be that each user is associated with a virtual port, but that only one user at a time may be associated with the primary port and thus be able to perform certain commands that are exclusive to the primary port. A high five may signal that the primary port will switch users, thus allowing the other user to perform gesture based commands that are exclusive to the primary port. As another example, certain handoff gestures may allow sets of users to control certain items or objects simultaneously. For example, prior to a handoff gesture, only a first user may be able to enter commands to control an avatar in a wrestling ring. However, after a handoff gesture, both the first user and the second user may be able to control the avatar simultaneously.

A gesture based system 12 may have memory 112 or memory 32 or any other memory in computing environment 12 with reference to FIGS. 2 and 3. The memory may have stored thereon one or more profiles containing information related to one or more users. In one embodiment, the profiles may contain information which may automatically associate a user with a virtual port. For example, a user may set a profile stored in memory that will automatically associate him with the primary port whenever he is in a capture area. As another example, a computing environment may store information about one or more users that may provide a typical or default order for association of virtual ports. In another embodiment, the primary user or owner of a gesture based system may be associated with the primary port whenever he is in a capture area. As another example, a gesture based system may store information about the inability that one or more users may have in controlling the gesture based system, thus the system may typically associate them with a secondary or tertiary port or the like.

A gesture based system may also use other information to establish associations with virtual ports. For example, if one or more children step into a capture area with a parent, the gesture based system may determine based on the size and other aspects of a user that there is a parent and children. The computing environment may thereafter associate or re-associate the virtual ports such that the parent is associated with the primary virtual port. As another example, if one or more users may be having difficulty providing gesture based input to the gesture based system, the system may re-associate the primary port to another user and provide feedback of the change of associated ports.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

What is claimed:

1. A method for managing a gesture based computing environment, comprising:
   receiving an image of a capture area;
   identifying a first user based on at least part of the first user being depicted in the image;
   associating the first user with a primary virtual port, the primary virtual port having associated therewith a feature that a secondary virtual port does not have, a user of the computing environment being able to be bound or unbound to the primary virtual port, the user being bound to the primary virtual port being indicative of the user being able to provide input to the computing environment via the primary virtual port;
   identifying a second user based on at least part of the second user being depicted in the image;
   associating the second user with the secondary virtual port in response to identifying the second user;
   disassociating the first user from the primary virtual port in response to the second user making a volunteer gesture, the first user making an exit gesture, or the first user losing a game; and
   updating an association of the second user from the secondary virtual port to the primary virtual port in response to dissociating the first user from the primary virtual port.

2. The method of claim 1, wherein updating an association of the second user from the secondary virtual port to the primary virtual port comprises:
   transferring a feature associated with the first user to the second user.

3. The method of claim 1, wherein associating the first user with the primary virtual port comprises:
   determining that the first user has performed an entry command.

4. The method of claim 1, wherein associating the first user with the primary virtual port comprises:
   associating the first user with the primary virtual port in response to determining that the first user has issued a volunteer command in response to issuing a prompt to the first and second users for a volunteer.

5. The method of claim 1, further comprising:
   determining an aspect of the first user or receiving user profile information for the first user; and
   wherein associating the first user with the primary virtual port is performed based on the aspect of the first user or the user profile information.

6. A system for managing a gesture based computing environment, comprising:
   a processor; and
   a memory bearing processor-executable instructions that, when executed on the processor, cause the system to at least:
   receive an image of a capture area;
   identify a first user based on at least part of the first user being depicted in the image;
   associate the first user with a primary virtual port, the primary virtual port having associated therewith a feature that a secondary virtual port does not have, a user of the computing environment being able to be bound or unbound to the primary virtual port, the user being bound to the primary virtual port being indicative of the user being able to provide input to the computing environment via the primary virtual port;
   identify a second user based on at least part of the second user being depicted in the image;
   associate the second user with the secondary virtual port in response to identifying the second user;
   disassociate the first user from the primary virtual port in response to the second user making a volunteer gesture, the first user making an exit gesture, or the first user losing a game; and
   update an association of the second user from the secondary virtual port to the primary virtual port in response to dissociating the first user from the primary virtual port.

7. The system of claim 6, wherein the image comprises a depth image.

8. A computer readable storage medium excluding signals bearing computer executable instructions for managing a gesture based computing environment that, when executed on a computer, cause the computer to perform operations comprising:
   receiving an image of a capture area;
   identifying a first user based on at least part of the first user being depicted in the image;
   associating the first user with a primary virtual port, the primary virtual port having associated therewith a feature that a secondary virtual port does not have, a user of the computing environment being able to be bound or unbound to the primary virtual port, the user being bound to the primary virtual port being indicative of the user being able to provide input to the computing environment via the primary virtual port;

identifying a second user based on at least part of the second user being depicted in the image;

associating the second user with the secondary virtual port in response to identifying the second user;

disassociating the first user from the primary virtual port in response to the second user making a volunteer gesture, the first user making an exit gesture, or the first user losing a game; and updating an association of the second user from the secondary virtual port to the primary virtual port in response to dissociating the first user from the primary virtual port.

* * * * *